Reissued July 29, 1941

Re. 21,865

UNITED STATES PATENT OFFICE 21,865

GEOCHEMICAL PROSPECTING

George S. Bays, Tulsa, Okla., assignor to Stanolind Oil and Gas Company, Tulsa, Okla., a corporation of Delaware No Drawing. Original No. 2,165,440, dated July 11, 1939, Serial No. 220,711, July 22, 1938. Application for reissue August 31, 1939, Serial No. 292,895

7 Claims. (Cl. 23—232)

This invention relates to the analysis of soils located at or near the surface of the earth as a method of determining the possible or probable presence of deep seated hydrocarbon deposits such as oil and gas. This method of geochemical prospecting is sometimes referred to as gas mapping or as soil gas surveying.

It has been found that deep seated petroleum and/or natural gas deposits are usually, or at least often, associated with hydrocarbon gases present in minute traces in surface soils immediately above, or more generally above and somewhat horizontally offset from, the deep petroleum-bearing or natural gas-bearing deposits. In many cases the hydrocarbon soil gases are not found in substantial quantities immediately above the deposit but rather in an area surrounding the deposit. In other cases the gases appear to seep or diffuse upward in minute amounts over geological periods of time along fault planes and the like. In any event, the analysis of these soil hydrocarbons in quantities measured in parts per million or parts per billion has proven to be a valuable method of geochemical prospecting for deep seated hydrocarbon reservoirs.

One common method of effecting geochemical exploration in accordance with the gas mapping technique is to take samples of the soil at depths ranging from a few inches to a number of feet below the surface, transport these samples to the laboratory and there analyze them for their hydrocarbon content and particularly for their content of ethane and heavier hydrocarbon gases. This can be done, for example, by driving off the soil gases from the soil sample by the use of heat and vacuum, removing water and carbon dioxide from the gases, condensing the hydrocarbon constituents in a liquid air trap, pumping off the methane from the condensed hydrocarbons by the use of a very high vacuum, and then measuring the amount of ethane and heavier hydrocarbons present in the liquid air trap by permitting the temperature to rise to atmospheric, or some other controlled extent, and measuring the pressure increase caused by the expansion of these hydrocarbons. The total hydrocarbons, including methane, present in a carbon dioxide free sample can and should also be measured, for instance, by burning them, removing water, condensing the carbon dioxide in a liquid air trap, permitting the temperature to rise, and determining the pressure increase occasioned by this expansion of the carbon dioxide.

From these values, and particularly from the amount of ethane and heavier hydrocarbon gases present in the soil sample, measured usually in parts per billion, maps can be prepared showing the ethane and heavier hydrocarbon concentrations at various locations over the area being surveyed, and these maps are more or less significant indications of the probable presence of deep seated hydrocarbon deposits.

I have found, however, that the maps thus obtained are often characterized by unaccountable anomalies which render the interpretation of such maps difficult, if not impossible, in some instances.

It is an object of my invention to provide means and methods for correcting these local anomalies. Another object of my invention is to provide new and improved methods of gas mapping which will permit more accurate interpretation of the results obtained. A further and more detailed object of my invention is to provide for determining the sorptive power of soils for hydrocarbon gases, thereby permitting the correction of soil gas analysis results. Other and more detailed objects, advantages, and uses of my invention will become apparent as the description thereof proceeds.

I have observed that many of the irregular results obtained in soil gas surveys can be accounted for through variations in the sorption characteristics of the soils which have been analyzed. I propose to remedy this defect in prior soil gas analysis work by rating each soil sample on the basis of its relative ability to sorb a hydrocarbon or other material or by otherwise determining the sorptive power of the sample. This can be done, for instance, by measuring the ability of the sample to sorb ethane and heavier hydrocarbons.

In accordance with my method, the soil sample is first analyzed by driving off the soil gases, removing carbon dioxide and water, and determining the content of ethane and heavier hydrocarbons present in it. As previously mentioned, it is also desirable to determine the methane content directly, or to do so by determination of the total hydrocarbon content.

As one embodiment of my invention, the denuded soil sample is then contacted under standardized conditions, with a known volume of air containing a standardized amount of ethane and heavier hydrocarbons preferably in about the proportions found in soil gas analysis work. The soil and sample thus contacted, are then brought to standardized conditions of temperature and pressure, and allowed to remain in contact with each other under these conditions for a standardized time interval which may suitably be one hour. The unsorbed gas is then removed from the soil sample by applying a standardized vacuum for a standardized period of time at a temperature such as atmospheric or by sweeping with air free from water, carbon dioxide and hydrocarbons. Following this operation, the sorbed hydrocarbon content of the soil gas is determined by exactly the same technique used to determine the original hydrocarbon content of the soil.

The values thus obtained for sorbed hydrocarbons under standardized conditions are indicative of the sorption characteristics of these particular soils, and it will be apparent that if a soil sample is found to have an unusually high sorptive ability for these hydrocarbons, this factor may account for an unusually high ethane and heavier concentration and vice versa.

With the relative sorptive efficiencies of the various soil samples established, a corrective factor can be applied to each original soil gas determination so that the corrected hydrocarbon concentration values will more accurately reflect the amount of ethane and heavier hydrocarbons which have passed through the soil over a geological period of time. Thus, these corrected results have a much more direct and reliable correlation with the presence of underground petroleum deposits than do uncorrected values which often reflect differences in sorption characteristics of the soil rather than, or in addition to, differences due to the geological factors which it is the purpose of the survey to study.

This correction factor can be applied in various ways; thus, for example, the amount of ethane and heavier hydrocarbons sorbed under the standardized test conditions by a typical or average soil sample, can be taken as unity, and the amount sorbed by other samples in the survey can be given values greater or less than unity in proportion to the amount of hydrocarbons sorbed by them compared with the amount sorbed by the sample given a unity rating. These ratings can be divided into the original ethane and heavier concentrates obtained for the same samples in the soil gas survey to obtain corrected values to be used in the preparation of maps.

A quantitative basis for correction can be obtained by observing the sorptive power of two soils located close together but showing divergent ethane concentrations since in this case the divergence is presumably due to difference in sorptive powers.

While I have described my invention in connection with certain preferred embodiments thereof, it is to be understood that these are by way of illustration and not by way of limitation, and that I do not mean to be bound thereby, but only to the valid scope of the appended claims.

The appended claims call for determining (or measuring) the sorptive abilities (or sorptive powers) of soils. By those terms as used in the appended claims, I refer to the actual determination or measurement of sorptive abilities or sorptive powers, for instance by direct determination or measurement of the amounts of hydrocarbons which the soils will sorb or by a study of both grain size and composition of the soils. I do not include within the expressions determining (or measuring) the sorptive abilities (or sorptive powers) of soils as used in the appended claims, any determination or measurement restricted to the determination or measurement of the relative amounts of relatively coarse particles or sand and relatively fine particles or clay in the soils.

I claim:

1. A method of soil gas surveying comprising determining hydrocarbon contents of soil gas samples from various soils, and determining the relative sorptive abilities of said soils to provide a basis for more accurate correlation of data obtained by the determination of the hydrocarbon contents of said various soils.

2. A method according to claim 1 in which the hydrocarbon contents determined are ethane and heavier hydrocarbon contents.

3. A method of soil gas surveying comprising determining hydrocarbon contents of soil gas samples from soils at various locations in the area being surveyed, and determining the relative abilities of said soils to sorb hydrocarbons under standardized conditions, thereby obtaining data for more accurate interpretation of results obtained by the determination of the hydrocarbon contents of said soils.

4. A method of soil gas surveying comprising determining the amount of hydrocarbon gases heavier than methane in each of a plurality of soil samples taken at spaced intervals over the territory to be surveyed, determining the relative sorptive powers of said soil samples for gases heavier than methane, and applying the relative sorption characteristics of said samples to the amount of hydrocarbon gases originally determined to correct for irregularities occasioned by variations in the sorption characteristics of the various soils.

5. A method of soil gas surveying comprising taking a plurality of soil samples at spaced intervals, analyzing each of said samples for its hydrocarbon content, measuring the sorptive powers of each of said samples for similar hydrocarbons, and applying the relative sorption characteristics of said samples to the amount of hydrocarbons originally determined to correct for irregularities occasioned by variations in the sorption characteristics of the various soils.

6. A method of soil gas surveying comprising taking samples of a plurality of soils at spaced intervals, analyzing each of said soils for its hydrocarbon content, and measuring the sorptive powers of each of said soils to provide a basis for more accurate correlation of data obtained by the determination of the hydrocarbon contents of said various soils.

7. A method of soil gas surveying comprising taking samples of a plurality of soils at spaced intervals, driving off soil gases from each of said soils, analyzing said soil gases for hydrocarbons contained therein, and measuring the sorptive powers of each of said soils to provide a basis for more accurate correlation of data obtained by the determination of the hydrocarbon contents of said various soils.

GEORGE S. BAYS.